United States Patent [19]

Rendessy

[11] 3,837,676

[45] Sept. 24, 1974

[54] SWAY CONTROL DEVICE FOR TRAILER HITCHES

[76] Inventor: William L. Rendessy, 8028 N. 14th Pl., Phoenix, Ariz. 85021

[22] Filed: June 14, 1972

[21] Appl. No.: 262,466

Related U.S. Application Data

[63] Continuation-in-part of Ser. No. 848,602, Aug. 8, 1969, Pat. No. 3,680,891.

[52] U.S. Cl............................................ 280/446 B
[51] Int. Cl............................................. B60d 1/00
[58] Field of Search................... 254/190, 191, 192; 280/446 B, 446, 461, 474

[56] References Cited
UNITED STATES PATENTS

| | | | |
|---|---|---|---|
| 2,628,855 | 2/1953 | Cushman | 287/76 |
| 3,305,246 | 2/1967 | Gonczy et al. | 280/446 B |
| 3,338,595 | 8/1967 | Bogie | 280/446 B |
| 3,362,727 | 1/1968 | Malherbe | 280/446 B |
| 3,659,874 | 5/1972 | Rendessy | 280/446 B |
| 3,680,891 | 8/1972 | Rendessy | 280/446 B |

FOREIGN PATENTS OR APPLICATIONS

| | | | |
|---|---|---|---|
| 876,044 | 5/1953 | Germany | 280/446 B |

Primary Examiner—Leo Friaglia
Assistant Examiner—Randall A. Schrecengost
Attorney, Agent, or Firm—Warren F. B. Lindsley

[57] ABSTRACT

A sway control device for trailer hitches comprising a cable means having opposite ends and an intermediate portion; said intermediate portion engaged by a plurality of rotary members at least one of said rotors frictionally damped to resist the movement of said rotor; said cable engaging peripheral portions of said rotors substantially less than 360° thereof and being disposed in a serpentine path about said rotors so as to provide substantial peripheral engagement of said cable therewith; opposite ends of said cable removably connectable to a towing vehicle in laterally spaced relation to the normal pivotal hitch connection of a trailer and towing vehicle; the disclosure also devoted to novel frictional bearing means for said rotors such that tension and deployment of said cable thereabout causes substantial damping and friction to resist rotation of said rotors and to thereby damp movement of said pivotal hitch connection. Further, the disclosure relates to toggle means for imposing tension upon said cable to cause substantial friction dampening of said rotors on their respective axle means.

19 Claims, 17 Drawing Figures

PATENTED SEP 24 1974 3,837,676

SWAY CONTROL DEVICE FOR TRAILER HITCHES

This application is a continuation, in part, of my copending application 848,602 filed Aug. 8, 1969, now U.S. Pat. No. 3,680,891.

BACKGROUND OF THE INVENTION

Various sway control devices for trailer hitches have been utilized and some of them have been relatively complicated and expensive as compared to others. Additionally, some of the prior art trailer hitch sway control devices have been difficult to mount on a variety of trailer tongues, and various prior art devices have been difficult to install and/or expensive. Furthermore, many of these prior art devices have required critical adjustments relative to longitudinal alignment of a trailer and towing vehicle preliminary to operation, and have therefore been difficult to install and maintain.

SUMMARY OF THE INVENTION

The present invention relates to a novel sway control device for trailer hitches which is very simple in that it employs a plurality of rotors mounted on the trailer; the rotors having singular annular peripheral grooves which converge radially inward and the sway control employs a simple cable engaged in said grooves and having its opposite ends coupled to a towing vehicle. The rotors are so arranged that the cable engages the rotors substantially less than 360° and said cable is disposed in a serpentine path in order to provide for substantial peripheral engagement of the rotors in order to maintain substantial frictional engagement thereof with said rotors so that damping means resisting rotary movement of said rotors may impose substantial damping force relative to the cable and the trailer in connection with a towing vehicle.

The invention also employs very simple axle bearing means for the rotors which are frictionally related to the axle bearing means such that a tensioning device which applies tension to the cable causes the rotors to be forced frictionally relative to the axle bearing means thereof to thereby provide damping force resisting rotary movement of the rotors. Additionally, the cable of the invention, which is engaged in the inwardly converging annular grooves of the rotors, is provided with a deformable plastic sheath which may wedgingly engage the inwardly converging grooves of the rotors such that opposed flats are caused to form on the cable in engagement with the converging walls of the annular grooves to thereby provide a high wedging frictional engagement of the cable with the rotors. Further, toggle means is provided to tension the cable and cause deformation of the plastic sheath in the inwardly converging annular groove of the rotors such that substantial frictional engagement of the cable with the rotors may be attained, whereby the rotors may be provided with large diameter axle shafts having a substantial coefficient of friction with the rotors such that said rotors are frictionally restrained on the axle shafts to an extent of rotational resistance which is slightly less than the rotational gripping of the cable relative to the rotors, thus obtaining an optimum relationship between the friction on the axle shafts and the gripping force of the cable in the inwardly converging annular grooves of the rotors. Further, the invention employs novel mounting brackets for mounting the rotors in such position on opposite sides of a trailer tongue that the cable of the invention is held in a serpentine path around the peripheral grooves of the rotors and whereby said brackets are readily adaptable to various trailer tongues for simplicity and economy of mounting the rotors thereon.

Accordingly, it is an object of the present invention to provide a very simple, universal, economical and efficient sway control device for trailer hitches.

Another object of the invention is to provide a novel cable operated sway control for trailer hitches which employs a cable arranged over a plurality of rotors in a serpentine path in order to provide substantial engagement of the cable with each of the rotors for a distance of substantially less than 360 degrees about the periphery of each of the rotors.

Another object of the invention is to provide a novel and simple arrangement of a cable having a plastic sheath engaged in inwardly converging annular grooves of rotors such that when said cable is under tension and opposite ends thereof are secured to a towing vehicle and the rotors are mounted on a trailer, that the plastic sheath structure of the cable is forced into the inwardly converging grooves of the rotors to provide for substantial driving engagement of the rotors so that damping means of the rotors may afford damping resistance to movement of the cables and relative movement of a trailer tongue and a towing vehicle about a pivotal hitch connection between the two.

Another object of the invention is to provide a novel damping means for cable operated rotors wherein an enlarged axle shaft of each rotor is frictionally engaged by the rotor as it rotates thereabout and whereby tension of the cable causes frictional damping engagement of the rotor relative to its axle shaft.

Another object of the invention is to provide a novel sway control for trailer hitches wherein a cable or other flexible tension resisting member may be utilized for engagement with rotors in a serpentine path.

Another object of the invention is to provide novel bracket mounting means for rotors over which a sway control cable may be engaged.

Further objects and advantages of the invention may be apparent from the following specification, appended claims and accompanying drawings.

DESCRIPTION OF THE PREFERRED EMBODIMENTS

Figure 1:
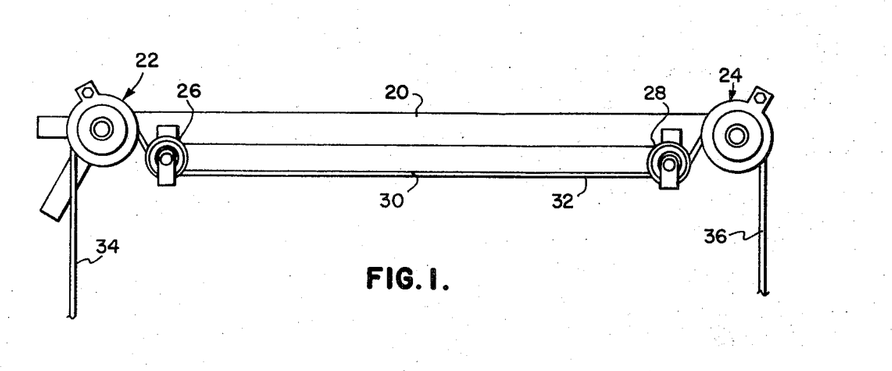
FIG. 1 is a fragmentary plan sectional view of a serpentine sway control device for trailer hitches as disclosed in FIG. 14 of my copending application, Ser. No. 848,602, filed Aug. 8, 1969.

FIG. 1 of the present continuation in part application corresponds to FIG. 14 of my copending application, Ser. No. 848,602 filed Aug. 8, 1969.

As shown in FIG. 1, the invention comprises a bar 20 carrying frictionally restrained rotor assemblies 22 and 24, the assembly 22 being a releasably mounted assembly.

Adjacent to the periphery of the assembly 22 is a stationary cable guide rotor 26 and adjacent to the assembly 24, as shown in FIG. 1, is a stationary cable engaging guide rotor 28. These rotors 26 and 28 are stationarily mounted idler rotor assemblies. These rotor assemblies 26 and 28 act as idlers and are so disposed that they maintain the intermediate portion of the cable 32 engaged frictionally with substantially 180 degrees of the frictionally restrained rotors of the rotor assemblies 22 and 24.

It will be seen that the idlers 26 and 28 thus maintain the cable 32 in a serpentine path around the roto assemblies 22 and around the idler rollers 26 and 28. In this manner the idler rotors 26 and 28 holding the cable in a serpentine path provide for substantial peripheral engagement of the cable with the frictionally damped rotor assemblies 22 and 24 while opposite end portions 34 and 36 extend forwardly into connected relation with the hitch means of a towing vehicle in a manner similar to that as will be hereinafter described in connection with the disclosure of FIG. 2 of the drawings.

Figure 2:
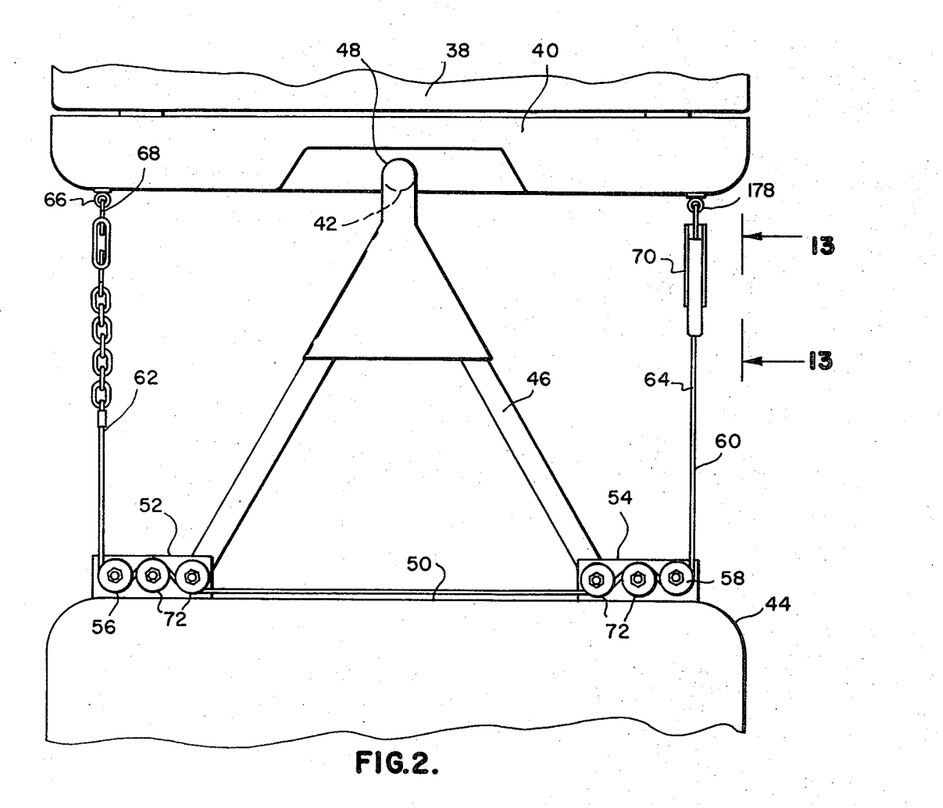
FIG. 2 is a top plan view of another specie of a sway control device for trailer hitches, showing a towing vehicle and a trailer connected thereto, fragmentarily.

Reference is hereby made to FIG. 2 in which a towing vehicle 38 is provided with a hitch means 40 which is usually a structural bumper or the like, on which a conventional hitch ball 42 is mounted. A trailer 44 is provided with a front end from which extends a tongue 46 having a conventional socket 48 engaged over the ball 42 and forming a universal pivotal connection therewith.

Mounted on the tongue 46 adjacent a frontal portion 50 of the trailer are brackets 52 and 54 fixed to the tongue 46 and held in closely adjacent relationship to the frontal portion 50 of the trailer so as to provide an unobstructed tongue portion of the trailer for mounting of butane bottles, spare tires, and other equipment.

Mounted on the bracket 52 is a first rotor 56 and mounted on the bracket 54 is a second rotor 58 over which an intermediate portion of a cable 60 is disposed. The cable is provided with opposite ends 62 and 64. The end 62 is connected to a fixture 66 on the bumper or hitch 40 of the towing vehicle and this is accomplished by a removable hook 68 while the end 64 of the cable 60 is coupled by means of an over center toggle mechanism 70, the details of which will be hereinafter described in connection with FIGS. 12, 13 and 14.

Mounted on each of the brackets 52 and 54 are second rotors 72 which are similar in construction and so mounted that they are in a substantially straight line row relative to the respective rotors 56 and 58. The intermediate portion of the cable 60 being disposed over the peripheries of these first and second rotors 56 and the third rotor 72 in a substantially serpentine path in order to provide for substantial arcuate engagement of the intermediate portion of the cable 60 relative to the peripheries of all of the rotors, 56, 58 and 72.

Figure 7:
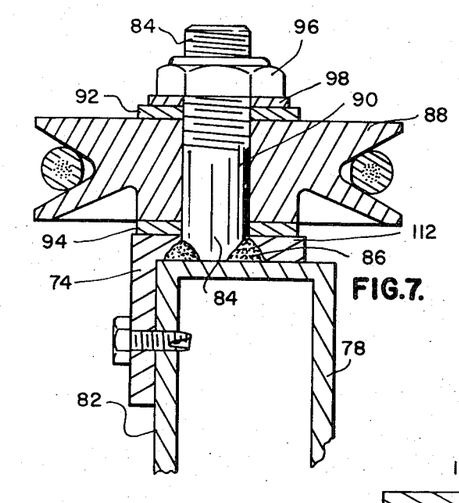
FIG. 7 is a vertical sectional view taken from the line 7—7 of FIG. 6, showing the structure of one rotor together with the bracket and the rotor axle on enlarged scale.
Figure 8:
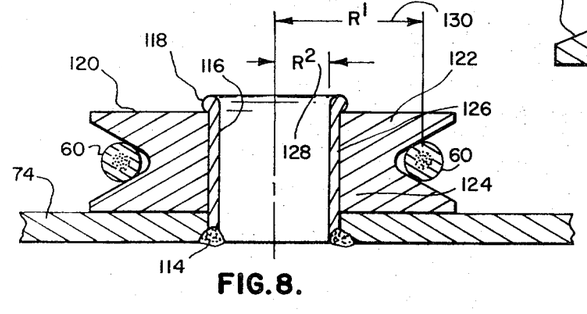
FIG. 8 is an enlarged fragmentary sectional view similar to FIG. 7, but showing a modification of the rotor axle thereof and the engagement of an inwardly converging annular groove of the rotor by a plastic-coated cable.
Figure 9:
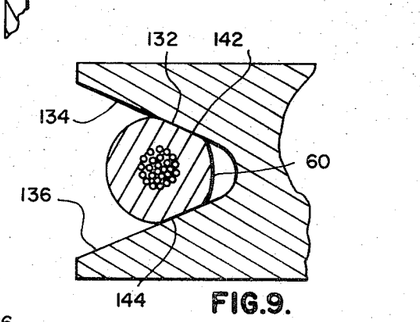
FIG. 9 is a sectional view similar to FIG. 8, showing on enlarged scale a portion of the cable engaging rotor with the cable of the invention engaged therein and showing the plastic sheath of the cable deformed into opposing flats with the cable wedged in the inwardly converging annular groove of the rotor.

The structural mounting and pivotal bearings, as well as the damping means of the rotors 56, 58 and 72 may be as shown in FIGS. 7 and 8 of the drawings, and as will be hereinafter described. The cable 60 may be constructed with a plastic sheath such as shown in FIG. 9 of the drawings, as will be hereinafter described.

Figure 3:
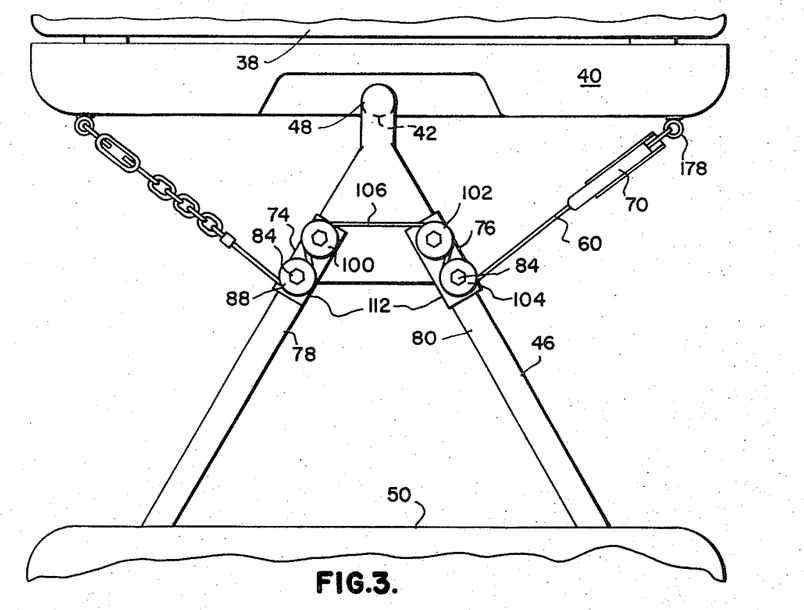
FIG. 3 is another view similar to FIG. 2 but showing a varying arrangement of a serpentine cable arrangement in engagement with a plurality of rotors.

As shown in FIG. 3 of the drawings, a pair of brackets 74 and 76 are mounted on respective converging portions 78 and 80 of the trailer tongue 46. These brackets are preferably made of angle iron and are constructed substantially as shown in FIG. 7 of the drawings. The bracket 74 is disclosed in detail in FIG. 7 of the drawings. This bracket 74 is secured to a side 82 of the tongue portion 78 and an axle bolt 84 is welded at 86 to the angle member 74 and extends upwardly on a substantially vertical axis. Mounted on the bracket 74 is a first rotor 88 having a bore 90 shown in FIG. 7. This bore 90 surrounds and frictionally engages the axle shaft 84 and in addition friction plates 92 and 94 engage upper and lower portions of the rotor 88 while a screw threaded nut 96, engaging a spring washer 98 is adjustable screw threadably on the axle shaft 84 to provide clamping friction to cause frictional engagement of the friction plates 92 and 94 so as to provide for frictional resistance of the rotor 88 relative to rotation about the axis of the axle shaft 84.

While the friction plates 92 and 94 may be used as a damping means, an equivalent thereof is disclosed in FIG. 8 wherein a large hollow axle shaft serves as the sole frictional damping means, as will be hereinafter described.

The bracket 76 is similar to the bracket 74 and pivotally mounted on the bracket 74 is a third rotor means 100 corresponding to a similar third rotor means 102 on the bracket 76. While the bracket 74 carries the first rotor 88, the bracket 76 carries a corresponding second rotor 104, and an intermediate portion 106 of the cable 108 is disposed in a serpentine path over the rotors 88, 100, 102 and 104, and opposite ends of the cable 108 are secured to the bumper or hitch member 40 of the towing vehicle by means of the fixture 66 and the toggle mechanism 70, as will be hereinafter described.

Figure 4:
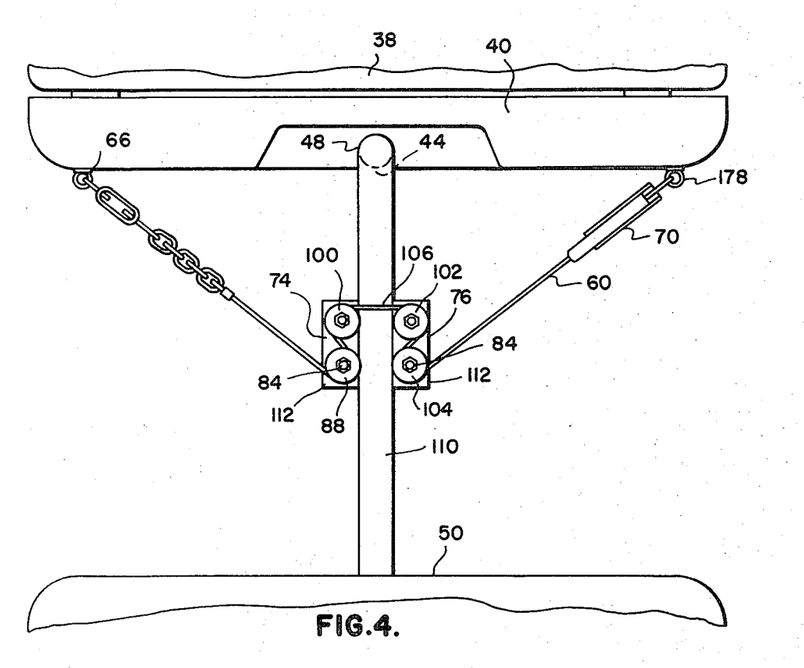
FIG. 4 is another view similar to FIGS. 2 and 3, showing a varying position of rotor mounting brackets such as disclosed in FIG. 3.

The brackets 74 and 76, shown in FIG. 3, are secured to opposite converging tongue portions 78 and 80 of the tongue 46 at the front 50 of the trailer and as shown in FIG. 4 of the drawings, a single tongue bar 110 projects from the front of the trailer 50 and this bar carries the conventional socket 48 fitted over the conventional hitch ball 42 on the hitch bumper 40 of the towing vehicle 38. The brackets 74 and 76, shown in FIG. 3 of the drawings, are used at opposite sides of the tongue bar 110 in FIG. 4; however, the angle flanges are turned outwardly away from the tongue bar 110 rather than overlying the tongue bar as shown in FIG. 7. Reference is being made to the disclosure of FIG. 7 wherein the flange 112 of the angle 74 is over the top of the tongue bar member 78, and as shown in FIG. 4 of the drawings, the respective flanges 112 of the brackets 74 and 76 are directed outwardly away from the tongue bar 110.

Figure 5:
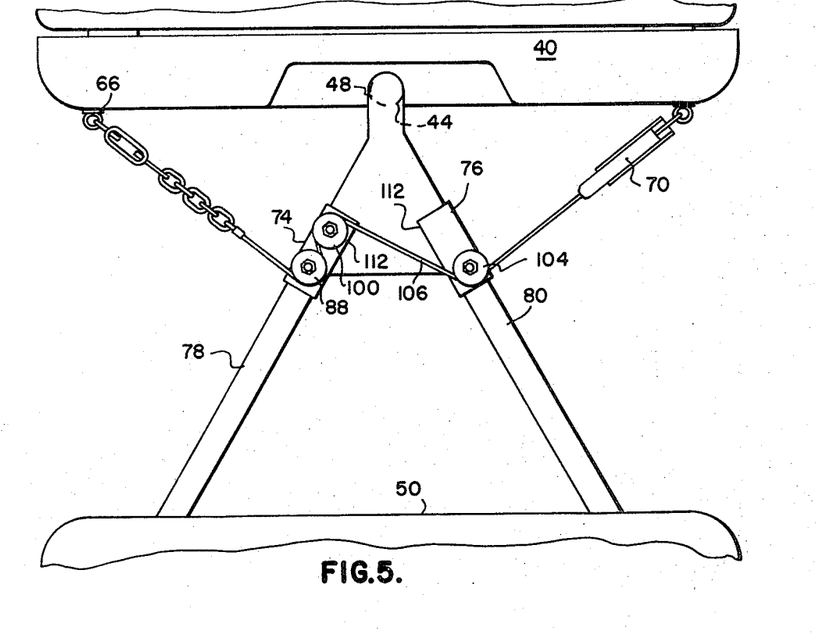
FIG. 5 is another view similar to FIGS. 2, 3 and 4, showing rotor mounting brackets in a different position for holding rotors in a different arrangement for serpentine engagement by a cable.
Figure 6:
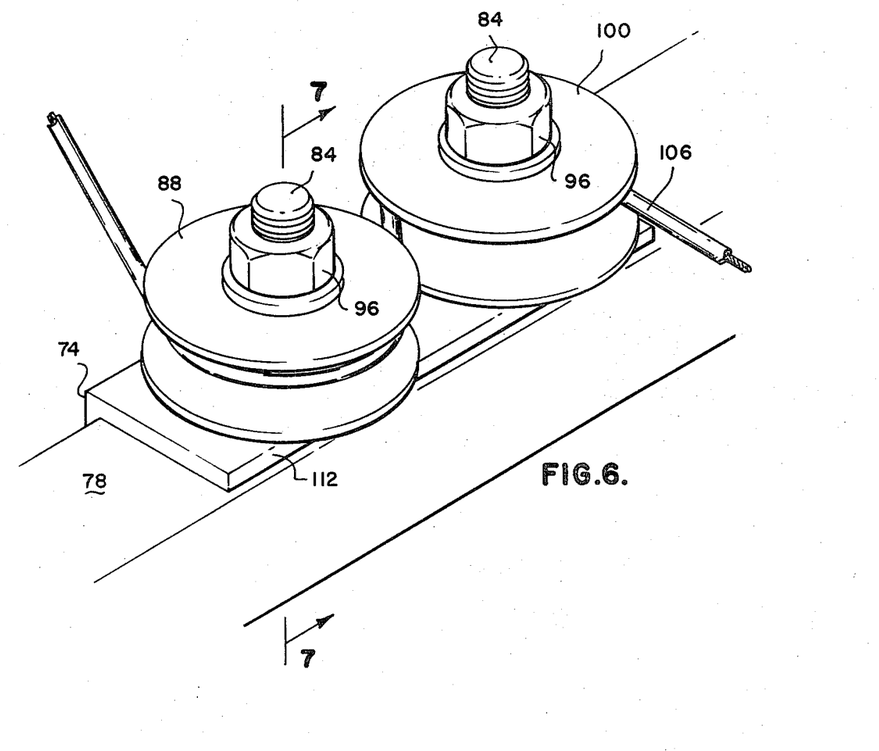
FIG. 6 is an enlarged fragmentary sectional view of one bracket and a pair of rotors as shown in FIG. 5 of the drawings.

As shown in FIG. 4, the respective rotors 88, 100, 102 and 104 are similar to those disclosed in FIG. 3 and may be mounted frictionally as shown in FIG. 7 or as shown in FIG. 8 as will be hereinafter described. As shown in FIG. 5, the trailer tongue members 78 and 80 carry the brackets 74 and 76 in a similar manner to that shown in FIG. 3, and the rotors 88 and 100 are mounted on the bracket 74 in a similar manner to that as shown in FIG. 3. The bracket 76, however, carries only the rotor 104 and omits the rotor 102. However, the intermediate portion 106 of the cable is disposed in a serpentine path over the rotors 88, 100 and 104 in a different relationship than that as shown in FIGS. 3 and 4 of the drawings. It will be obvious that varying the number of rotors, as shown in FIGS. 2, 3, 4 and 5, may vary the damping force obtained and also the frictional engagement of the cable relative to the aggregate of the peripheries of the rotors, and further it will be understood that the various mounting of these pulleys may be varied to accommodate different hitch tongue constructions as well as the disposition of various articles or fixtures carried on the tongues of the trailer forwardly of the front 50 thereof.

The angle member 74, as shown in FIG. 8, is similar to that as shown in FIG. 7 and welded thereto at 114 is a hollow tubular axle means 116 having a radially directed flange 118 adjacent a side 120 of a rotor 122 which is similar to the rotor 88 hereinbefore described. The rotor 122 has an enlarged bore 124 frictionally and rotatably operable about the periphery 126 of the axle means 116. The flange 118 retains the rotor 122 adjacent to the angle member 74 or bracket 74 and when the cable 60 is tightened by the toggle 70, as will be hereinafter described, force of the rotor bore 126 on the periphery 124 of the axle shaft 116 causes frictional resistance to rotation of the rotor 122 about the axis of the axle means 116.

It will be understood that the diameter of the axle shaft 116 is quite large compared to the diameter of the rotor and that the radius 128 of the axle shaft may equal as much as 35% or more of the radius 130 from the center of the axle shaft to the center of the cable 60. Thus a substantial momentum is provided to the frictional bore 126 of the rotor 122 so as to provide for substantial frictional resistance to rotation of the rotor 122 about the axle shaft 116 when the cable 60 forces the rotor 122 into firm lateral engagement with the periphery of the shaft 116 at the bore 126.

It will be understood that friction damping means as defined herein shall be construed to mean either friction damping surface means 92 and 94 or the friction of the rotor at its bore portion about the periphery of the respective axle shaft upon which it is rotatably mounted.

As shown in FIG. 12 of the drawings of my copending Pat. application, Ser. No. 848,602 filed Aug. 8, 1969, a frictionally restrained rotor is provided with a converging angular groove while a cable is impregnated with a plastic material which provides an external plastic coating having a high coefficient of friction relative to the converging angular groove of the rotor so as to provide maximum holding force when the periphery of the plastic coated cable is wedged in the converging angular groove.

As shown in FIG. 9, each of the rotors as disclosed herein is preferably provided with an annular, generally V-shaped in cross section groove 132 having radially inward converging annular walls 134 and 136 in which the periphery of the cable 60 is wedgingly engaged, the cable 60 being provided with a central cable structure employing steel strands 138 and a substantially thick plastic sheath 140 bonded thereto, the plastic sheath 140 tending to be deformed and flattened at 142 and 144 as shown in FIG. 9, the flattened portions 142 and 144 conforming with the opposed converging annular walls 134 and 136 when the cable 60 is under tension and held tight by the toggle mechanism 70, as will be hereinafter described. Accordingly, it will be seen that the plastic sheath deformed into flats 142 and 144 and wedged between the converging annular walls 134 and 136 attains substantial frictional gripping of the cable so that it may rotate any one of the aforementioned rotors relative to its axle shaft and relative to frictional damping therearound, which frictional damping may have a resistance slightly less than the frictional holding of the cable in the respective inwardly converging annular groove of the respective rotor. Thus optimum damping may be employed with respect to the frictional engagement of the cable with the rotor and it will be understood that a plurality of rotors as shown herein and hereinbefore described may be used to attain frictional damping in proportion to the requirements, as for example the device shown in FIG. 2 employs six rotors, all of which may be frictionally damped and the serpentine engagement of the cable therewith provides very substantial engagement of the cable with peripheries of the rotors to afford driving operation thereof with attendant frictional damping of the respective rotors tending to restrain movement of the cable relative to the axis of each rotor.

Figure 10:
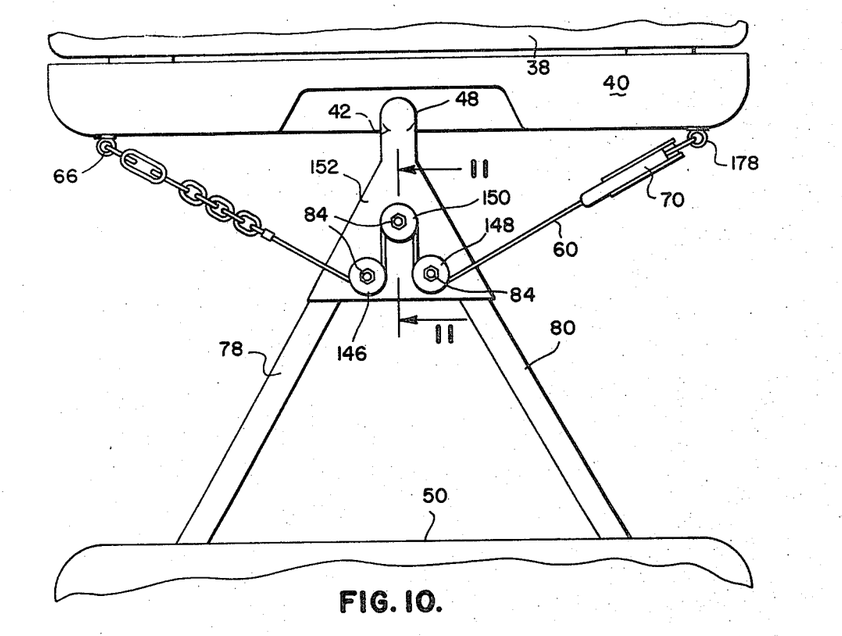
FIG. 10 is another view similar to FIGS. 2, 3 and 4, showing a further embodiment of a serpentine sway control device for trailer hitches in accordance with the invention.

As shown in FIG. 10 of the drawings, a first rotor 146 and a second rotor 148 correspond functionally to the hereinbefore described rotors 88 and 104. A third rotor means 150 may correspond to any one of the rotors 100 and 102, however all three rotors 146, 148 and 150 are mounted on a conventional triangular or other shaped plate structure 152 of a conventional trailer tongue such as shown in FIGS. 3 and 10 of the drawings. The respective axle bolts 84 are welded at their lower end to the plate 152 in a similar manner to the weld 86 of the axle shaft 84 on the bracket 74, hereinbefore described.

The mounting of the rotors 146, 148 and 150 on the conventional triangular plate 152 obviates the need for the expense of utilizing either of the brackets 74 and 76, if desired, and this arrangement may be utilized wherein trailer tongues are not provided with any structure which would obstruct the use of the triangular plate 152 for mounting the respective rotors 146, 148 and 150 as shown in FIG. 10 of the drawings.

Figure 11:
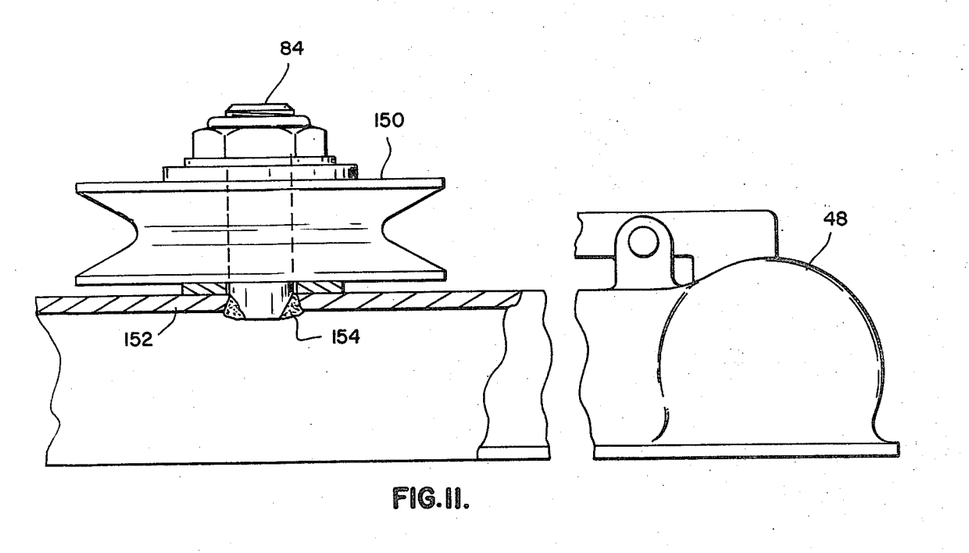
FIG. 11 is an enlarged fragmentary sectional view taken from the line 11—11 of FIG. 10.

The rotor 150, as shown in FIG. 11 of the drawings is rotatably mounted on an axle shaft 84 similar to the axle shaft 84 shown in FIG. 7, and a weldment 154 fixes the axle shaft 84 on the triangular plate 152 thus minimizing expense of mounting the rotors 146, 148 and 150 to hold the cable 60 in a serpentine path thereover, as hereinbefore described, relative to the various embodiments of the invention.

Figure 12:
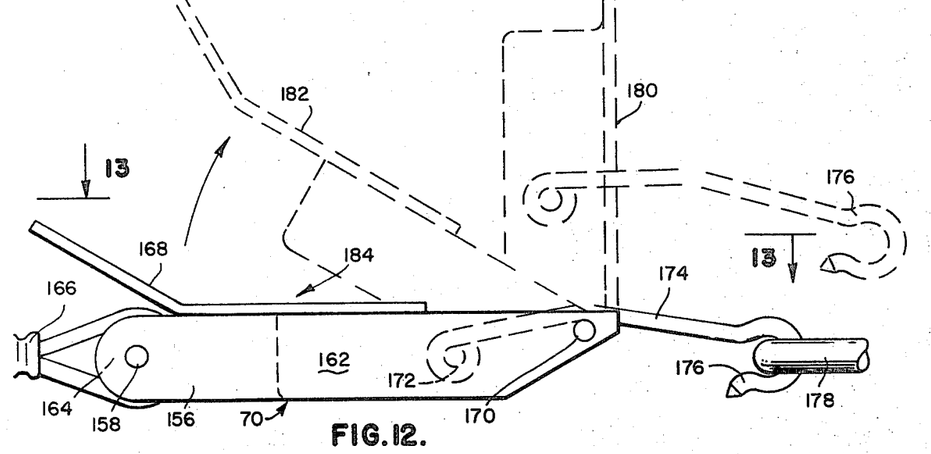
FIG. 12 is a side elevational view of a cable tensioning toggle mechanism of the invention, showing by broken lines varying positions of the parts thereof.
Figure 13:
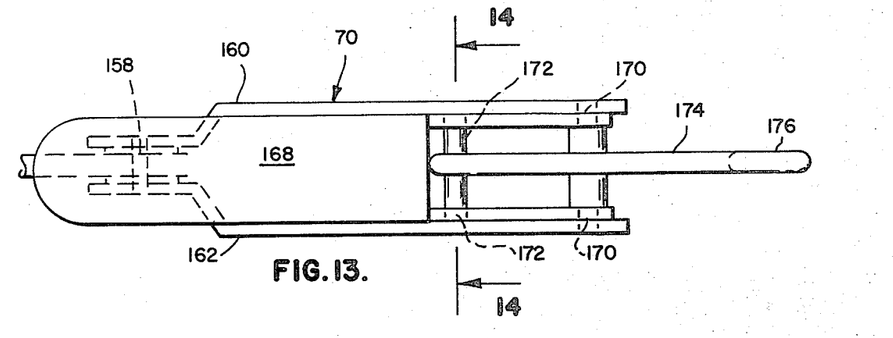
FIG. 13 is a fragmentary elevational view of the toggle mechanism taken from the line 13—13 of FIG. 12.
Figure 14:
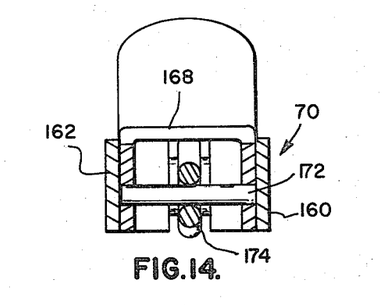
FIG. 14 is an enlarged transverse sectional view taken from the line 14—14 of FIG. 13.

The toggle mechanism 70 is shown in detail in FIGS. 12, 13 and 14 and with reference thereto it will be seen that the toggle mechanism 70 is provided with a frame 156 having a connection bolt 158 passing through opposite side members 160 and 162 of the frame 156. This bolt also passes through an eye 164 to which the cable 60 is connected by means of a swedged connection member 166.

A toggle handle 168 is pivoted between the frame plates 160 and 162 by means of a pivot pin 170 and a pivot pin 172 coupled to the toggle handle 168 pivotally connects a hook member 174 to the handle 168 and a hook 176 is adapted to engage through an eye member 178 on the towing vehicle bumper as shown in FIGS. 1, 2, 3, 4, 10, and 12. It will be seen that the pin 172 passes over center relative to the pin 170 and operates as a substantial toggle lock when the lever is pivoted from a broken line position 180 or 182 to the solid line position 184 shown in FIG. 12 of the drawings.

It will therefore be understood that the toggle mechanism, when moved from the broken line position 180 to the solid line position 184, that the hook 176 will be withdrawn and tend to cause tightening of the cable 60 about the peripheries of the rotors as hereinbefore described.

Figures 15, 16, 17:
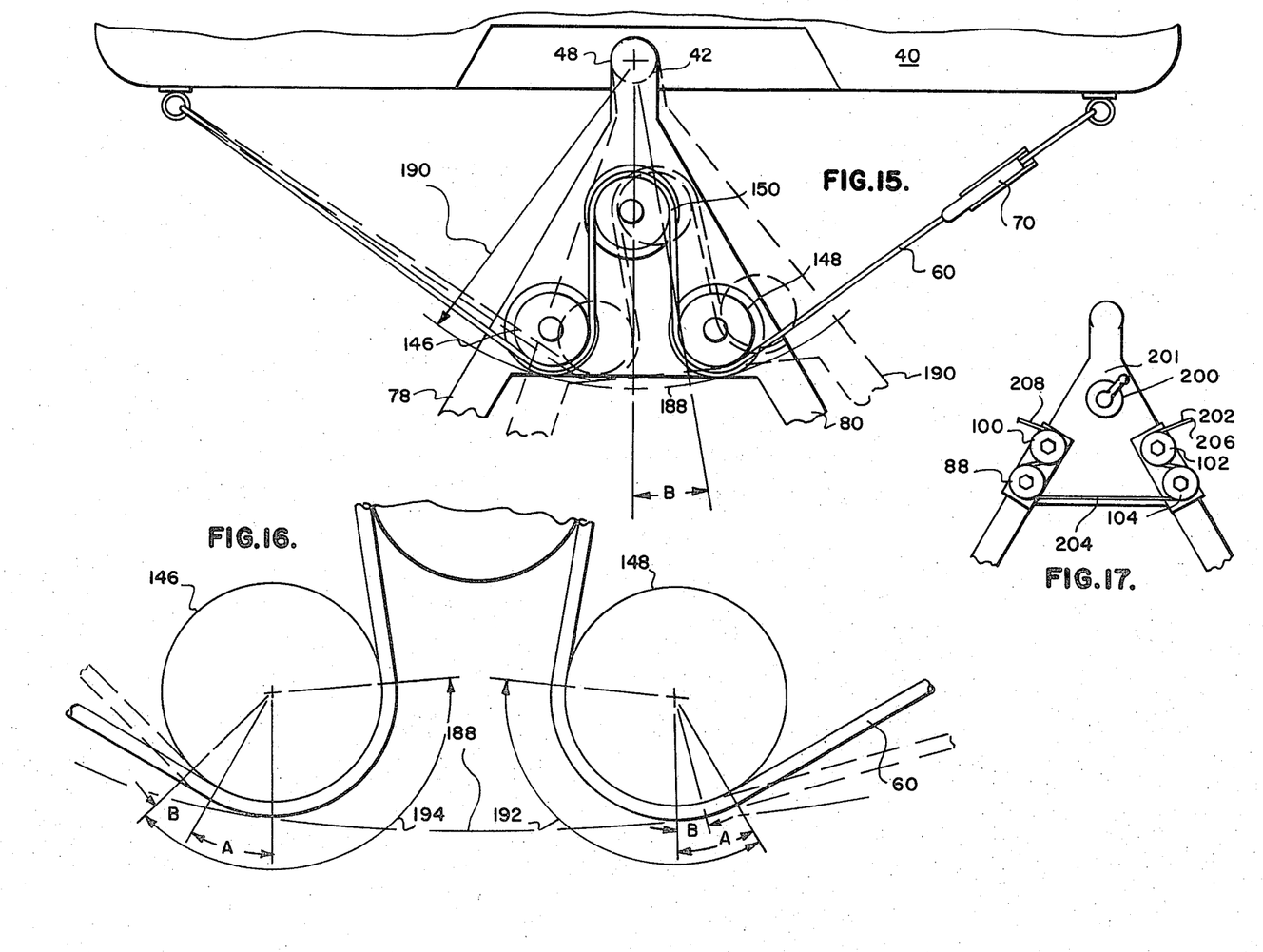
FIG. 15 is an enlarged fragmentary plan sectional view of mechanism similar to that shown in FIG. 10, and showing varying positions of the trailer hitch relative to the towing vehicle, to illustrate a generally common arcuate path of rotors of the damping mechanism about the pivotal axis of the trailer hitch.
FIG. 16 is an enlarged diagrammatic view of the mechanism shown in FIG. 15.
FIG. 17 is similar to FIG. 3, but showing a modification thereof in which the cable is disposed in a different path.

As shown in FIGS. 10 and 15 of the drawings, with particular reference to FIG. 15, the first and second rotors 146 and 148 and other corresponding rotors such as the rotors 88 and 104, respectively, move in an arcuate path 188 about a radius 190 having a center at the ball hitch structure 42 and 48 which forms a pivotal connection between the towing vehicle and the trailer. As shown in FIG. 16, when the trailer tongue is moved to a broken line position 190 the cable 60 unwinds from the rotor 148 and extends around the rotor 148 a distance designated 192, thereby reducing the peripheral engagement of the cable relative to the rotor 148 while the cable wraps to a greater peripheral extent around the rotor 146 to a degree indicated at 194, thereby compensating for linear displacement of the cable as the trailer tongue moves angularly relative to the towing vehicle. Thus the rotors 146 and 148, moving in a common arcuate path about the pivotal connection of the tongue, compensate for each other due to the fact that one rotor tends to progressively engage more of the cable about its periphery while the opposite rotor tends to disengage with the cable to a comparable degree about its periphery.

As shown in FIG. 17, the rotors 88, 100, 102 and 104 are disposed as shown in FIG. 3, however a cable 202 is provided with an intermediate portion 204 tangent to the rotors 88 and 104 and rearwardly relative to a tongue jack 200 on a conventional hitch plate 201 of the trailer tongue. Opposite end portions 206 and 208 of the cable diverge from each other and may be connected to a towing vehicle in a similar manner to that as shown in FIG. 3. Thus it will be seen that the serpentine path of the cable 202 does not interfere with the conventional jack 200.

It will be appreciated that the foregoing mode of operation tends to maintain a taut condition of the cable 60 during the turning of the towing vehicle and the trailer around a corner without losing a substantial amount of cable tension.

With the foregoing in mind it will be appreciated that slight curves in the highway at which normal operating speeds may be maintained, that the cable 60 will be maintained taut in a self-compensating manner about the arcuate path 188, as hereinbefore described, and that during all highway operation where sway control is critical, that the cable 60 will thus be maintained taut and fully operative respective to the rotors and their damping friction in the various modes of operation as hereinbefore described in FIGS. 7 and 8 of the drawings.

It will be obvious to those skilled in the art that various modifications of the invention may be resorted to without departing from the spirit of the invention.

I claim:

1. A sway control device for mounting on the tongue of a vehicle towed trailer comprising in combination:

first and second rotors rotatably mounted on the tongue of the trailer at positions spaced from each other laterally one on each side of the longitudinal axis of the tongue, rotor means rotatably mounted on said tongue and spaced laterally from a line interconnecting said first and second rotors, a flexible tensioning means comprising first and second end portions and an intermediate portion, said intermediate portion of said tensioning means engaging each of the peripheries of said first and second rotors and said rotor means for less than 360° of their peripheries and operatively disposed thereon in a serpentine path, said first and second end portions of said tensioning means being connectable to a towing vehicle at points spaced equally from the attachment of the vehicle to the trailer tongue, a first means for adjusting the tension on said tensioning means to keep said tensioning means tautly around said first and second rotors and said rotor means for inducing resistance to the movement of said tensioning means around said rotors, and a second means for at least one of said first and second rotors and said rotor means for retarding the free rotation of said one of said rotors and said rotor means.

2. The sway control device set forth in claim 1 wherein:

said first means comprises a toggle means for facilitating the loosening and tightening of the tensioning means around said rotors and said rotor means.

3. The sway control device set forth in claim 1 wherein:

said first and second rotors and said rotor means are mounted in a common plane.

4. The sway control device set forth in claim 1 wherein:

said second means comprises means for frictionally damping said one of said rotors and said rotor means.

5. The sway control device set forth in claim 1 wherein:

said second means comprises means for frictionally damping said rotor means.

6. The sway control device set forth in claim 1 wherein:

the periphery of at least said first and second rotors are grooved for receiving said tensioning means, and said tensioning means comprises a coated metallic cable.

7. The sway control device set forth in claim 1 wherein:

first and second rotors and said rotor means are rotatably mounted on shafts fixedly attached to the tongue in a parallel arrangement.

8. The sway control device set forth in claim 1 wherein:

said intermediate portion of said tensioning means is operatively disposed partially around said first and second rotors and said rotor means in an undeviating serpentine path.

9. The sway control device set forth in claim 1 wherein:

said second means comprises a friction bearing surface on the tongue for damping its rotation.

10. The sway control device set forth in claim 6 wherein:

said groove is adapted to wedgingly engage opposite portions of the periphery of said cable.

11. The sway control device set forth in claim 1 wherein:

said first and second rotors and said rotor means are mounted on at least one bracket which is secured to said tongue.

12. The sway control device set forth in claim 1 wherein said rotor means comprises a third and fourth rotor, said third rotor is mounted on one side of the longitudinal axis of the tongue, and said fourth rotor mounted on the other side of the longitudinal axis of the tongue, whereby a line interconnecting their axes would be substantially perpendicular to the longitudinal axis of the tongue.

13. A sway control device for mounting on the tongue of a vehicle towed trailer comprising in combination:

first and second rotors rotatably mounted on the tongue of the trailer at positions spaced from each other laterally one on each side of the longitudinal axis of said tongue adjacent the free end of the tongue, rotor means mounted on said tongue and spaced laterally from a line interconnecting said first and second rotors in a direction toward the free end of the tongue, a flexible tensioning means comprising a first and second end portion and an intermediate portion, said intermediate portion of said tensioning means engaging each of the peripheries of said first and second rotors and said rotor means for less than 360 degrees of their peripheries and operatively disposed therearound in a serpentine path, said first and second end portions of said tensioning means being connectable to a towing vehicle at points spaced equally from the attachment of the vehicle to the trailer tongue, the distance between the points on the towing vehicle being substantially greater than the distance between said first and second rotors.

14. The sway control device set forth in claim 13 wherein:

the distance between the points on the towing vehicle being at least twice the distance between said first and second rotors.

15. The sway control device set forth in claim 13 wherein:

said first and second rotors and said rotor means are mounted on a common plane.

16. The sway control device set forth in claim 13 in further combination with:

toggle means for adjusting the tension on said tensioning means to keep said tensioning means tautly around said first and second rotors and said rotor means for inducing resistance to the movement of said tensioning means around said rotors.

17. The sway control device set forth in claim 13 in further combination with:

means for rotatably restraining the movement of at least one of said rotors and said rotor means about its axis.

18. The sway control device set forth in claim 13 wherein:

at least one of said rotors and said rotor means utilize said tongue as a friction bearing surface to restrain rotatable movement thereof.

19. A sway control for mounting on the tongue of a trailer comprising in combination:

a flexible tensioning means having opposite ends and comprising a left portion, a right portion and an intermediate portion, a first rotor rotatably mounted on a shaft secured to the left side of said trailer, a second rotor rotatably mounted on a shaft secured to the right side of said trailer, rotor means comprising at least one additional rotor and one shaft rotatably mounted on said trailer for providing substantial increase in peripheral engagement relative to said first and second rotors and said intermediate portion of said flexible tensioning means, said first and second rotors and said rotor means mounted perpendicular to each of their respective shafts and generally on the same horizontal plane relative to each other, said intermediate portion of said flexible tensioning means engaging each of the peripheries of said rotors and said rotor means less than 360 degrees and operably disposed thereon in a linear undeviating serpentine path, a first connection means provided for each of said opposite ends of said flexible tensioning means, a second connection means provided on the rear portion of said towing vehicle spaced substantially equal distant each side of said pivotal hitch connection to which said first connection means is demountably secured, adjustable means provided for said flexible tensioning means about the periphery of said flexible tensioning means between said opposite ends of said first connection means, said serpentine movement of said intermediate portion of said flexible tensioning means engaging tautly said rotors and said rotor means inducing a substantial deflective resistance to its movement around said rotors and said rotor means thereby forming a first damping means restraining lateral movement of the trailer, the biasing of said tautly engaged intermediate portion of said flexible tensioning means against the peripheries of a plurality of said rotors and said rotor means transmits said biasing action to the respective internal diameters of said rotors and said rotor means against the respective external diameters of their associated rotor shafts thereby providing a second damping means restraining lateral movement of the trailer swinging about an arcuate path relative to the connection of the trailer to the towing vehicle.

\* \* \* \* \*